(12) United States Patent
Tan et al.

(10) Patent No.: US 10,948,738 B2
(45) Date of Patent: Mar. 16, 2021

(54) HOLOGRAPHIC DISPLAY DEVICE AND HOLOGRAPHIC DISPLAY METHOD

(71) Applicant: BOE TECHNOLOGY GROUP CO., LTD., Beijing (CN)

(72) Inventors: Jifeng Tan, Beijing (CN); Xue Dong, Beijing (CN); Wei Wang, Beijing (CN); Xiaochuan Chen, Beijing (CN); Yafeng Yang, Beijing (CN); Xin Gu, Beijing (CN); Feng Guan, Beijing (CN); Meili Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 471 days.

(21) Appl. No.: 15/748,670

(22) PCT Filed: Jul. 25, 2017

(86) PCT No.: PCT/CN2017/094291
§ 371 (c)(1),
(2) Date: Jan. 30, 2018

(87) PCT Pub. No.: WO2018/045840
PCT Pub. Date: Mar. 15, 2018

(65) Prior Publication Data
US 2020/0081262 A1 Mar. 12, 2020

(30) Foreign Application Priority Data
Sep. 9, 2016 (CN) .......................... 201610815078.8

(51) Int. Cl.
G02B 30/00 (2020.01)
G02B 27/01 (2006.01)
G03H 1/22 (2006.01)

(52) U.S. Cl.
CPC ......... *G02B 30/00* (2020.01); *G02B 27/0103* (2013.01); *G03H 1/22* (2013.01); *G03H 2240/13* (2013.01)

(58) Field of Classification Search
CPC ...... G02B 30/00; G02B 27/0103; G03H 1/22; G03H 2240/13
(Continued)

(56) References Cited

U.S. PATENT DOCUMENTS

| 2012/0120059 A1* | 5/2012 | Bratkovski ............... G03H 1/02 345/419 |
| 2013/0107194 A1* | 5/2013 | Wu ........................ G02B 5/3083 349/194 |

(Continued)

FOREIGN PATENT DOCUMENTS

| CN | 104049424 A | 9/2014 |
| CN | 105487239 A | 4/2016 |

(Continued)

OTHER PUBLICATIONS

International search report dated Oct. 11, 2017 for corresponding application No. PCT/CN2017/094291 with English translation attached.
(Continued)

*Primary Examiner* — Collin X Beatty
(74) *Attorney, Agent, or Firm* — Nath, Goldberg & Meyer; Joshua B. Goldberg

(57) ABSTRACT

There is provided a holographic display device, which includes a display panel including plural sub-pixels, wherein each sub-pixel includes plural subdivided pixels, and each subdivided pixel has an adjustable light transmittance; a backlight, configured to provide reference light to the display panel; a phase adjustment layer, including plural transparent phase adjustment components, wherein each phase adjustment component is configured to adjust a phase of a light ray transmitted through the phase adjustment component, and the phase adjustment components corresponding to a single sub-pixel have phase adjustment amounts different from each other; and a controller, configured to obtain a target phase of a light ray to be transmitted through each sub-pixel, and determine a target subdivided pixel, which corresponds to the target phase, in each sub-pixel, and
(Continued)

further configured to obtain a target intensity of the light ray, and adjust a light transmittance of the target subdivided pixel.

19 Claims, 4 Drawing Sheets

(58) Field of Classification Search
USPC .......................................................... 359/15
See application file for complete search history.

(56) References Cited

U.S. PATENT DOCUMENTS

| | | | |
|---|---|---|---|
| 2014/0055692 A1* | 2/2014 | Kroll | G02F 1/1347 |
| | | | 349/15 |
| 2015/0234221 A1* | 8/2015 | Anderson | G02F 1/13439 |
| | | | 349/113 |

FOREIGN PATENT DOCUMENTS

| | | |
|---|---|---|
| CN | 105676473 A | 6/2016 |
| CN | 105917277 A | 8/2016 |
| CN | 106154797 A | 11/2016 |
| CN | 106154800 A | 11/2016 |
| CN | 106227017 A | 12/2016 |
| CN | 205992124 U | 3/2017 |
| CN | 206002848 U | 3/2017 |
| CN | 206057815 U | 3/2017 |
| KR | 20150011202 A | 1/2015 |
| WO | 2008099585 A1 | 8/2008 |
| WO | 2015104239 A2 | 7/2015 |

OTHER PUBLICATIONS

Chinese office action dated Apr. 16, 2018 for corresponding application No. 201610815078.8 with English translation attached.

* cited by examiner

HOLOGRAPHIC DISPLAY DEVICE AND HOLOGRAPHIC DISPLAY METHOD

CROSS-REFERENCE TO RELATED APPLICATIONS

This is a National Phase Application filed under 35 U.S.C. 371 as a national stage of PCT/CN2017/094291, filed on Jul. 25, 2017, an application claiming the priority of Chinese Patent Application No. 201610815078.8, filed on Sep. 9, 2016, the contents of which are incorporated herein in their entirety by reference.

TECHNICAL FIELD

The present disclosure relates to the field of holographic display technology, and in particular, relates to a holographic display device and a holographic display method.

BACKGROUND

Holography is a recording and reproducing technology to record and reproduce a real three-dimensional image of an object by using the principles of interference and diffraction of light.

However, in the related art, after a hologram is formed on a holographic plate, a phase and an intensity of the interfered light are fixed, and thus only one hologram can be displayed (i.e., reproduced). Therefore, it is a technical problem to be solved urgently in the field to make a phase and an intensity recorded on the holographic plate adjustable so as to display different images.

SUMMARY

Embodiments of the present disclosure provide a holographic display device and a holographic display method.

In one aspect, embodiments of the present disclosure provide a holographic display device, including:

a display panel, including a plurality of sub-pixels, wherein each of the plurality of sub-pixels includes a plurality of subdivided pixels, and each of the plurality of subdivided pixels has an adjustable light transmittance;

a backlight, provided at a light incident side of the display panel, and configured to provide reference light to the display panel;

a phase adjustment layer, including a plurality of phase adjustment components which are transparent, wherein positions of the plurality of phase adjustment components are in one-to-one correspondence with positions of the plurality of subdivided pixels, each of the plurality of phase adjustment components is configured to adjust a phase of a light ray transmitted through the phase adjustment component, and the phase adjustment components corresponding to a single sub-pixel have phase adjustment amounts different from each other; and a controller, configured to obtain a target phase of a light ray to be transmitted through each of the plurality of sub-pixels of the display panel according to a position information of a to-be-displayed stereoscopic image and determine a target subdivided pixel, which corresponds to the target phase, in each of the plurality of sub-pixels, and the controller being further configured to obtain a target intensity of the light ray to be transmitted through each of the plurality of sub-pixels according to image information of the to-be-displayed stereoscopic image, and adjust a light transmittance of the target subdivided pixel in each of the plurality of sub-pixels according to the target intensity.

In some embodiments, each of the plurality of sub-pixels includes one target subdivided pixel in a case where one stereoscopic image is to be displayed; and the plurality of phase adjustment components have a configuration such that, in a case where light rays emitted from the target subdivided pixel pass through one of the phase adjustment components corresponding to the sub-pixel including the target subdivided pixel, reverse extension lines of light rays exiting from the one phase adjustment component converge at a position corresponding to the target phase of the sub-pixel.

In some embodiments, each of the plurality of sub-pixels includes two target subdivided pixels in a case where one stereoscopic image is to be displayed; and the plurality of phase adjustment components have a configuration such that, in a case where light rays emitted from the two target subdivided pixels pass through two of the phase adjustment components corresponding to the sub-pixel including the two target subdivided pixels, respectively, reverse extension lines of light rays exiting from the two phase adjustment components converge at a position corresponding to the target phase of the sub-pixel.

In some embodiments, the backlight is a collimated backlight emitting light in a thickness direction of the display panel.

In some embodiments, the backlight is configured to emit light towards different directions, and the controller is further configured to adjust directions of light rays transmitted through each of the subdivided pixels.

In some embodiments, the display panel includes an array substrate and an opposite substrate which are assembled to form a cell, a color filter layer is provided at a side of the opposite substrate proximal to the array substrate, the color filter layer includes a plurality of color resist blocks, and the plurality of color resist blocks are in one-to-one correspondence with the plurality of sub-pixels; and the phase adjustment layer is provided on the opposite substrate at the side where the color filter layer is located.

In some embodiments, the phase adjustment layer is located between the opposite substrate and the color filter layer.

In some embodiments, each of the phase adjustment components includes a plurality of gratings, the gratings in a single phase adjustment component have a same period, and the gratings in different phase adjustment components among the phase adjustment components corresponding to a single sub-pixel have different periods.

In some embodiments, a planarization layer is provided between the plurality of gratings and the color filter layer, and a refractive index of each of the plurality of gratings is different from that of the planarization layer.

In some embodiments, each of the plurality of gratings is made of a transparent resin.

In another aspect, embodiments of the present disclosure provide a holographic display method of the holographic display device as described above. The holographic display method includes, in a case where any one stereoscopic image is to be displayed, steps of:

obtaining a target phase of a light ray to be transmitted through each of the plurality of sub-pixels of the display panel according to a position information of a to-be-displayed stereoscopic image, and obtaining a target intensity of the light ray to be transmitted through each of the plurality of sub-pixels according to image information of the to-be-displayed stereoscopic image;

determining a target subdivided pixel, which corresponds to the target phase, in each of the plurality of sub-pixels, and adjusting a light transmittance of the target subdivided pixel in each of the plurality of sub-pixels according to the target intensity of each of the plurality of sub-pixels; and controlling the backlight to provide reference light to the display panel.

In some embodiments, the step of determining the target subdivided pixel, which corresponds to the target phase, in each of the plurality of sub-pixels includes a step of:

determining one subdivided pixel in each of the plurality of sub-pixels as the target subdivided pixel, wherein in a case where light rays emitted from the target subdivided pixel pass through one of the phase adjustment components corresponding to the sub-pixel including the target subdivided pixel, reverse extension lines of light rays exiting from the one phase adjustment component converge at a position corresponding to the target phase of the sub-pixel.

In some embodiments, the step of determining the target subdivided pixel, which corresponds to the target phase, in each of the plurality of sub-pixels includes a step of:

determining two subdivided pixels in each of the plurality of sub-pixels as the target subdivided pixels, wherein in a case where light rays emitted from the two target subdivided pixels pass through two of the phase adjustment components corresponding to the sub-pixel including the two target subdivided pixels, respectively, reverse extension lines of light rays exiting from the two phase adjustment components converge at a position corresponding to the target phase of the sub-pixel.

In some embodiments, in a case where the backlight is a collimated backlight emitting light in a thickness direction of the display panel, the step of determining the target subdivided pixel, which corresponds to the target phase, in each of the plurality of sub-pixels includes steps of:

determining a phase adjustment component which has a phase adjustment amount corresponding to the target phase as a target phase adjustment component, and determining a subdivided pixel which has a position corresponding to a position of the target phase adjustment component as the target subdivided pixel, so that in a case where light rays emitted from the target subdivided pixel pass through the phase adjustment component corresponding to the target subdivided pixel, reverse extension lines of light rays exiting from the phase adjustment component converge at a position corresponding to the target phase of the sub-pixel including the target subdivided pixel.

In some embodiments, in a case where the backlight is configured to emit light towards different directions, the step of determining the target subdivided pixel, which corresponds to the target phase, in each of the plurality of sub-pixels includes steps of:

adjusting directions of light rays transmitted through each of the subdivided pixels, and determining a subdivided pixel which emits light towards a phase adjustment component which has a phase adjustment amount corresponding to the target phase of the sub-pixel as the target subdivided pixel, so that in a case where light rays emitted from the target subdivided pixel pass through the phase adjustment component which has a phase adjustment amount corresponding to the target phase of the sub-pixel, reverse extension lines of light rays exiting from the phase adjustment component converge at a position corresponding to the target phase of the sub-pixel.

BRIEF DESCRIPTION OF THE DRAWINGS

The accompanying drawings, provided for better understanding of the present disclosure and constituting a part of the specification, are for the purpose of explaining the present disclosure together with the following embodiments, but are not intended to limit the scope of the present disclosure. In the drawings.

DETAILED DESCRIPTION

Embodiments of the present disclosure will be described in detail below with reference to the accompanying drawings. It should be noted that, the embodiments described herein are only for the purpose of explaining and illustrating the present disclosure, but are not intended to limit the scope of the present disclosure.

Figure 1:
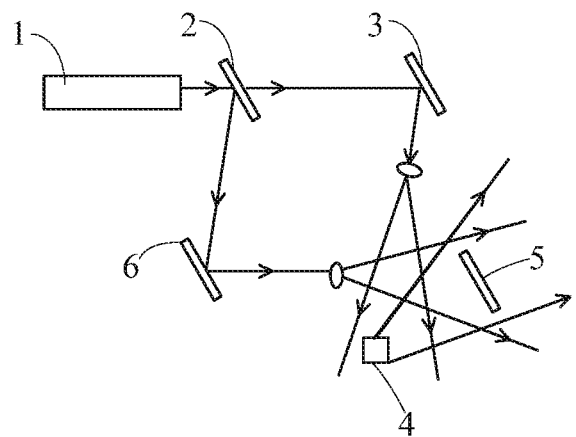
FIG. 1 is a schematic diagram showing a photographing process of the relevant holography.
Figure 2:
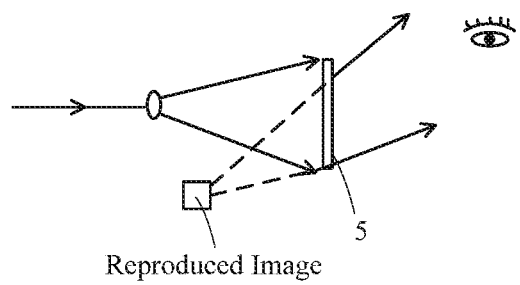
FIG. 2 is a schematic diagram showing a reproducing process of the relevant holography.

A first step of the holography is a photographing (i.e., recording) process. As shown in FIG. 1, during the photographing process, a coherent light beam emitted from a coherent light source 1 is split by a beam splitter 2 into two coherent light beams. One of the two coherent light beams is reflected by a reflecting mirror 3 and expanded by a beam expander such as a convex lens, and then irradiates onto an object 4. The coherent light beam reflected and scattered by a surface of the object 4, which functions as an object beam, irradiates onto a hologram recording medium such as a holographic plate 5. The other of the two coherent light beams, which functions as a reference beam, is reflected by a reflecting mirror 6 and expanded by a beam expander such as a convex lens, and then irradiates onto the holographic plate 5. The object beam and the reference beam interfere with each other to form a plurality of interference fringes on the holographic plate 5. After the holographic plate 5 is developed, an interference pattern including the plurality of interference fringes is obtained, i.e., a hologram including information about a phase and an intensity of the interfered light is obtained. A second step of the holography is an imaging (i.e., reproducing) process. As shown in FIG. 2, during the imaging process, a light beam identical to the reference beam employed during the photographing process is irradiated onto the holographic plate 5. Human eyes view the holographic plate 5 against the direction of the transmitted light, and can see a reproduced image (or a virtual image) which is identical to an original object at a position where the original object is located.

Figure 3:
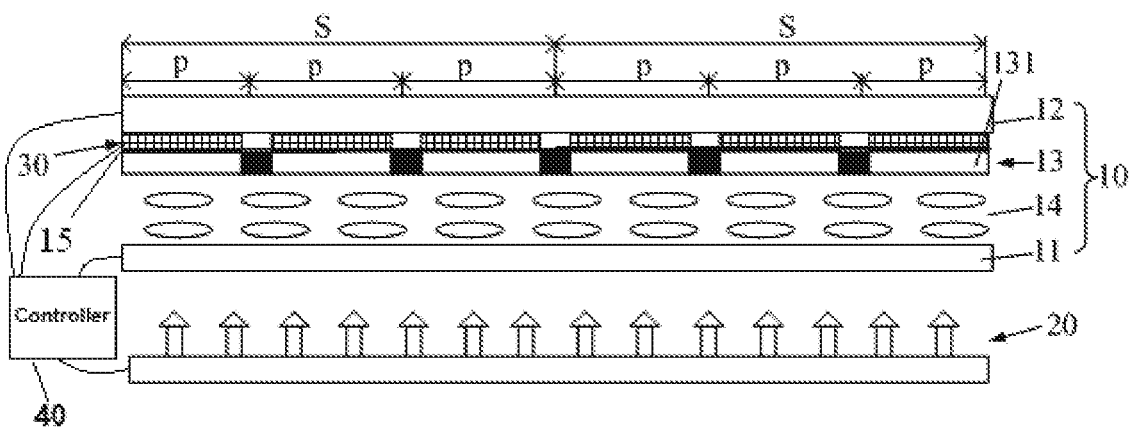
FIG. 3 is a schematic diagram showing a structure of a holographic display device according to an embodiment of the present disclosure.
Figures 4, 5A, 5B:
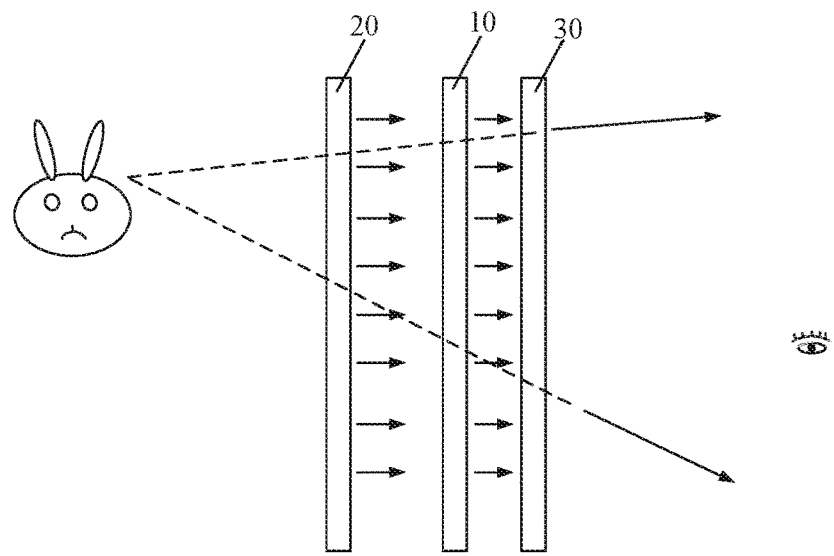
FIG. 4 is a schematic diagram showing the principle of displaying a hologram by a holographic display device according to an embodiment of the present disclosure.
FIG. 5a is a schematic diagram showing a first distribution of subdivided pixels in each of sub-pixels and a corresponding distribution of phase adjustment components according to an embodiment of the present disclosure.
FIG. 5b is a schematic diagram showing a second distribution of subdivided pixels in each of sub-pixels and a corresponding distribution of phase adjustment components according to an embodiment of the present disclosure.

An embodiment of the present disclosure provides a holographic display device. As shown in FIGS. 3 and 4, the holographic display device includes a display panel 10, a backlight 20, a phase adjustment layer 30, and a controller 40. The display panel 10 includes a plurality of sub-pixels p. As shown in FIGS. 5a and 5b, each of the plurality of sub-pixels p includes a plurality of subdivided pixels p1 to p9 (as shown in FIG. 5a) or a plurality of subdivided pixels p1 to p16 (as shown in FIG. 5b), and each of the plurality of subdivided pixels has an adjustable light transmittance. The backlight 20 is provided at a light incident side of the display panel 10, and configured to provide reference light to the display panel 10. The light incident side is a side of an array substrate 11 of the display panel 10 distal to an opposite substrate 12, as will be further described below.

It should be noted that, the phase adjustment layer 30 may be provided inside of the display panel 10 (as shown in FIG. 3), or may be provided outside of the display panel 10 (as shown in FIG. 4). For example, the phase adjustment layer 30 may be provided between the array substrate 11 and the opposite substrate 12 (as shown in FIG. 3), or may be provided at a side of the opposite substrate 12 distal to the array substrate 11 (as shown in FIG. 4). In an example as shown in FIG. 3, the phase adjustment layer 30 is a part of the display panel 10, while in an example as shown in FIG. 4, the phase adjustment layer 30 is a part of the holographic display device.

In an example, the backlight 20 may emit white light, and the plurality of sub-pixels p of the display panel 10 may be red sub-pixels, green sub-pixels, and blue sub-pixels which are arranged periodically, every three consecutive sub-pixels of red, green, and blue constitute one pixel unit S. Herein, the red, green, and blue sub-pixels mean that, light appear in red, green, and blue after passing through the red, green, and blue sub-pixels, respectively, in a case where the red, green, and blue sub-pixels operate to have certain light transmittances. By adjusting amounts of light transmitted through the sub-pixels p in a single pixel unit S, the brightnesses of light exiting from the sub-pixels p may be adjusted, and the pixel unit S may display various colors by mixing the light exiting from the sub-pixels p. Alternatively, each of the pixel units S may include sub-pixels p of other quantities and other colors. It should be noted that, the plurality of subdivided pixels in a single sub-pixel p display a same color, and in a case where any one of the subdivided pixels in each of the sub-pixels p has a light transmittance larger than zero, the sub-pixel allows light to pass therethrough. For example, the display panel 10 may be a liquid crystal display panel. As shown in FIG. 3, the display panel 10 may include the array substrate 11 and the opposite substrate 12 assembled to form a cell, and a liquid crystal layer 14 may be provided between the array substrate 11 and the opposite substrate 12. A pixel electrode (not shown) may be provided at a position on the array substrate 11 corresponding to each of the subdivided pixels, and a common electrode (not shown) may be provided on the array substrate 11 or on the opposite substrate 12. Liquid crystal molecules in each of the subdivided pixels rotate in response to an electric field generated between the pixel electrodes and the common electrode, and thus a light transmittance of each of the subdivided pixels is adjusted. A color filter layer 13 may be provided on the opposite substrate 12, and may include a plurality of color resist blocks 131. Each of the plurality of sub-pixels p corresponds to one of the plurality of color resist blocks 131, and light appears in a color corresponding to a color of each of the color resist blocks 131 after passing through the color resist block 131. The color resist block 131 corresponding to each of the sub-pixels p may be formed integrally, or may include a plurality of color resist sub-blocks, each of the color resist sub-blocks corresponding to one of the subdivided pixels, and a light shading material being provided between any two adjacent color resist sub-blocks to form a black matrix. Alternatively, the backlight 20 may emit light rays of different colors (e.g., red, green, and blue). In this case, the color filter layer 13 may be omitted, and different sub-pixels p in a single pixel unit S may display different colors to be mixed into a desired color by switching the colors of light rays emitted from the backlight 20, and transmitting the light rays of different colors through different sub-pixels p in the single pixel unit S.

As shown in FIGS. 5a and 5b, the phase adjustment layer 30 includes a plurality of transparent phase adjustment components R1 to R9 (as shown in FIG. 5a) or a plurality of transparent phase adjustment components R1 to R16 (as shown in FIG. 5b), and positions of the plurality of phase adjustment components are in one-to-one correspondence with those of the plurality of subdivided pixels. The phase adjustment components corresponding to a single sub-pixel p may have phase adjustment amounts different from each other. For example, the phase adjustment components R1 to R9 as shown in FIG. 5a may have phase adjustment amounts different from each other, and the phase adjustment components R1 to R16 as shown in FIG. 5b may have phase adjustment amounts different from each other. For example, each of the phase adjustment components may include a plurality of gratings. Further, the phase adjustment layer 30 may be provided inside of the display panel 10, or may be provided outside of the display panel 10. For example, the phase adjustment layer 30 may be provided between the array substrate 11 and the opposite substrate 12, or may be provided at a side of the opposite substrate 12 distal to the array substrate 11.

As an example, the phase adjustment layer 30 may be a phase delay plate, and different phase adjustment components may have different thicknesses or different refractive indexes, respectively.

The controller 40 is configured to obtain a target phase of a light ray to be transmitted through each of the plurality of sub-pixels p of the display panel 10 according to a position information of a to-be-displayed stereoscopic image, and determine a target subdivided pixel, which correspond to the target phase, in each of the plurality of sub-pixels p. The controller 40 is further configured to obtain a target intensity of the light ray to be transmitted through each of the plurality of sub-pixels p according to image information of the to-be-displayed stereoscopic image, and adjust a light transmittance of the target subdivided pixel in each of the plurality of sub-pixels p according to the target intensity. The subdivided pixels other than the target subdivided pixel may have a light transmittance of zero. The position information may include depth-of-field information of the to-be-displayed stereoscopic image (i.e., a distance between the to-be-displayed stereoscopic image and a human eye) and an angle of the to-be-displayed stereoscopic image relative to a human eye. The image information may include color information and brightness information of the to-be-displayed stereoscopic image. It should be noted that the controller 40 may be connected to the display panel 10, the backlight 20, and the phase adjustment layer 30. The controller 40 may be a central processing unit (CPU), a microprocessor, or the like, and may include firmware or software implementing the functions described herein.

A photographing process (i.e., recording process) of a three-dimensional image (i.e., a stereoscopic image) may be performed by the controller 40 or another computer in the manner of simulation, and phase information and intensity information (i.e., amplitude information) of an object wave may be obtained by computer generated holography (CGH) and stored. For this purpose, the holographic display device may further include a memory for storing relevant information and software. Herein, reference light employed in the simulation of photographing process may have the same light-wave information as that of the reference light provided by the backlight according to the present disclosure. During the display of a hologram, the reference light irradiates towards the display panel 10. In a case where the light rays transmitted through each of the plurality of sub-pixels p of the display panel 10 have the corresponding target phases and the corresponding target intensities and enter into human eyes, according to the reversibility of a light path, the human eyes can see a stereoscopic image, which has the same color and brightness as those of an original object, present at a position where the original object is located, as shown in FIG. 4. Assuming that the stereoscopic image is considered to consist of a plurality of "image points", reverse extension lines of light rays transmitted through the sub-pixels p of each of the pixel units S will converge at one of the "image points" of the stereoscopic image. Herein, directions of light rays transmitted through the sub-pixels p depend on the phases of the light rays, and thus a position where the stereoscopic image will be displayed is determined. Brightness of light rays transmitted through the sub-pixels depends on the intensities of the light rays, and thus the color and brightness of the stereoscopic image are determined. It should be noted that, in a case where identical light rays are incident onto different phase adjustment components corresponding to a single pixel unit, the light rays exiting from the different phase adjustment components may have different phases. For human eyes, difference in an exiting direction means that the light rays exiting from each of the phase adjustment components will converge at a point in the direction opposite to the exiting direction, and the light rays exiting from different phase adjustment components will converge at different points. However, during the display of a hologram, once a target phase of each of the plurality of sub-pixels is determined according to the position information of the to-be-displayed stereoscopic image, the target subdivided pixels corresponding to the target phase may be controlled to be activated, and the remaining subdivided pixels are deactivated. In this way, human eyes will see that the light rays emitted from a single pixel unit converge at a single position, i.e., a position of one of "image points".

Since each of the plurality of sub-pixels p includes the plurality of subdivided pixels each having an adjustable light transmittance, the plurality of subdivided pixels of each of the plurality of sub-pixels p correspond to a plurality of phase adjustment components having phase adjustment amounts different from each other, respectively. Thus, by adjusting a light-transmissive position (i.e., subdivided pixel) of each of the plurality of sub-pixels p, phases of the light rays transmitted through each of the plurality of sub-pixels p may be adjusted. Further, by adjusting a light transmittance of each of the subdivided pixels, intensities of the light rays transmitted through each of the plurality of sub-pixels p may be adjusted. In a case of displaying one stereoscopic image, a target phase and a target intensity, which correspond to the to-be-displayed stereoscopic image, of each of the plurality of sub-pixels p are obtained, and the corresponding target phase and the corresponding target intensity can be reached by adjusting the phases and intensities of the light rays transmitted through each of the plurality of sub-pixels p. Thus, human eyes can see a reproduced stereoscopic image which has the same color and brightness as those of an original object and is present at a position where the original object is located. In a case of displaying different images, different stereoscopic images may be displayed by adjusting light transmittances of corresponding subdivided pixels according to target phases and target intensities corresponding to the images to be displayed. Dynamic holographic display may be achieved in a case where a frequency at which images are displayed is relative high, for example, 24 or more stereoscopic images are displayed per second.

The quantity and arrangement of the subdivided pixels in each of the plurality of sub-pixels p are not limited herein. For example, as shown in FIG. 5a, each of the plurality of sub-pixels p may include 3×3 subdivided pixels p1 to p9, and correspondingly, the phase adjustment components R1 to R9 are provided at a position corresponding to each of the plurality of sub-pixels. Alternatively, each of the plurality of sub-pixels p may include 4×4 subdivided pixels p1 to p16, as shown in FIG. 5b, and correspondingly, phase adjustment components R1 to R16 are provided at a position corresponding to each of the plurality of sub-pixels. It should be noted that, the more subdivided pixels in each of the sub-pixels p, the larger quantity of phases that the light rays emitted from the sub-pixel p can have. Thus, a target phase may be achieved more easily, and the reproduced image is clearer.

In a case where one subdivided pixel in each of the sub-pixels p has a light transmittance greater than zero and the light rays transmitted through the subdivided pixel irradiate onto a phase adjustment component, the light rays will undergo diffraction to result in a certain diffraction angle and to enter human eyes. Reverse extension lines of the diffracted light rays will converge at (or pass through) a corresponding one of the "image points". In a case where two subdivided pixels in each of the sub-pixels p have light transmittances greater than zero and the light rays transmitted through the two subdivided pixels irradiate onto two phase adjustment components, respectively, due to the phase adjustment amounts of the two phase adjustment components being different from each other, the light rays transmitted through the two subdivided pixels will enter into human eyes in different directions, and reverse extension lines of two diffracted light rays will converge at a corresponding one of the "image points".

Figure 7A:
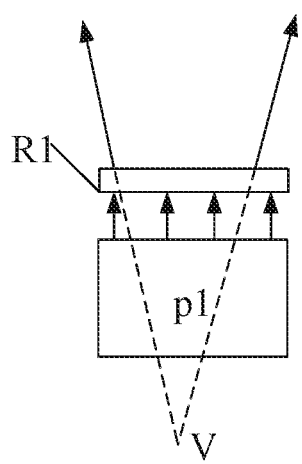
FIG. 7a is a schematic diagram showing light paths in a case where each of sub-pixels has one target subdivided pixel according to an embodiment of the present disclosure.

In an example, in a case of displaying one stereoscopic image, there may be one subdivided pixel in each of the plurality of sub-pixels p, and the plurality of phase adjustment components have a configuration such that, in a case where light rays emitted from the target subdivided pixel pass through one of the phase adjustment components corresponding to the sub-pixel including the target subdivided pixel, reverse extension lines of light rays exiting from the phase adjustment component converge at a position corresponding to the target phase of the sub-pixel. A position of the phase adjustment component meeting the above requirement may or may not correspond to a position of the target subdivided pixel. As shown in FIG. 7a, after light rays emitted from the target subdivided pixel p1 pass through the phase adjustment component R1, at least two light rays with different directions are generated and enter into human eyes, and then the human eyes can see that reverse extension lines thereof converge at one of the "image points", such as the point V shown in FIG. 7a. Thus, the phase adjustment component may have such a configuration that, in a case where light rays emitted from any one of the subdivided pixels pass through the phase adjustment component, light rays having a certain diffraction angle can be emitted from the phase adjustment component.

Figure 7B:
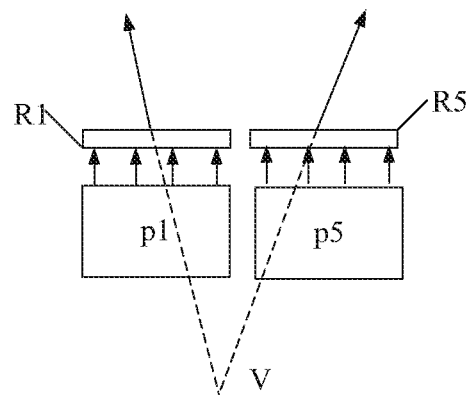
FIG. 7b is a schematic diagram showing light paths in a case where each of sub-pixels has two target subdivided pixels according to an embodiment of the present disclosure.

Alternatively, in a case of displaying one stereoscopic image, there may be two target subdivided pixels in each of the plurality of sub-pixels p, and the plurality of phase adjustment components have a configuration such that, in a case where light rays emitted from the two target subdivided pixels pass through two of the phase adjustment components corresponding to the sub-pixel including the two target subdivided pixels, respectively, reverse extension lines of light rays exiting from the two phase adjustment components converge at a position corresponding to the target phase of the sub-pixel. For example, as shown in FIG. 7b, in a case where a light ray emitted from the target subdivided pixel p1 passes through the phase adjustment component R1 and a light ray emitted from the target subdivided pixel p5 passes through the phase adjustment component R5, the light rays exiting from the phase adjustment component R1 and the phase adjustment component R5 enter into human eyes, and then the human eyes can see that reverse extension lines of the two light rays converge at an "image point", such as the point V as shown in FIG. 7b. In this case, specific configurations of the phase adjustment components may be set such that light rays emitted from a single phase adjustment component travel along a same direction or along different directions, on condition that reverse extension lines of light rays exiting from two phase adjustment components converge at one point after light rays emitted from two target subdivided pixels are transmitted through the two phase adjustment components. From the foregoing description, it can be seen that, after light rays emitted from all of the target subdivided pixels in a single pixel unit pass through the phase adjustment layer 30, reverse extension lines of the light rays will converge at a single "image point".

Optionally, in the holographic display device according to the present disclosure, the backlight 20 may be a collimated backlight emitting light in a thickness direction of the display panel 10, or may be a non-collimated backlight capable of emitting light in various directions.

Figure 6A:
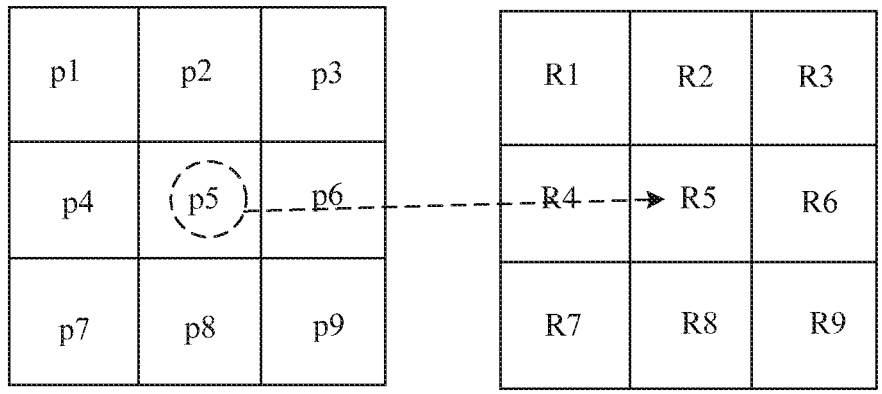
FIG. 6a is a schematic diagram showing a first correspondence between a light ray transmitted through a sub-pixel and phase adjustment components according to an embodiment of the present disclosure.
Figure 6B:
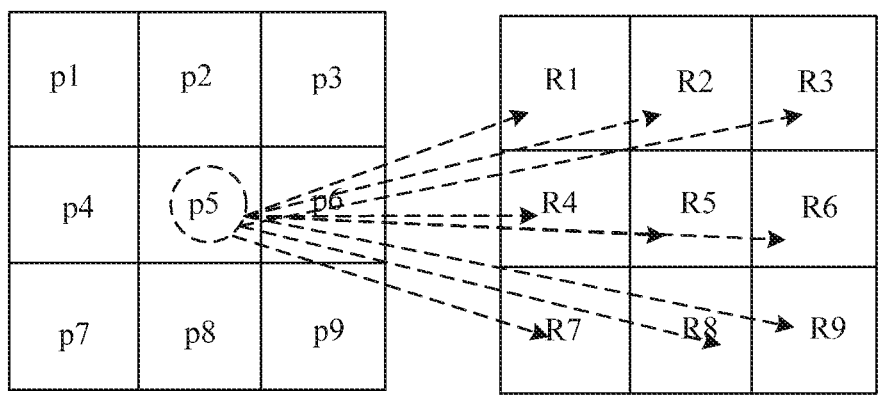
FIG. 6b is a schematic diagram showing a second correspondence between light rays transmitted through a sub-pixel and the phase adjustment components according to an embodiment of the present disclosure.
Figure 6C:
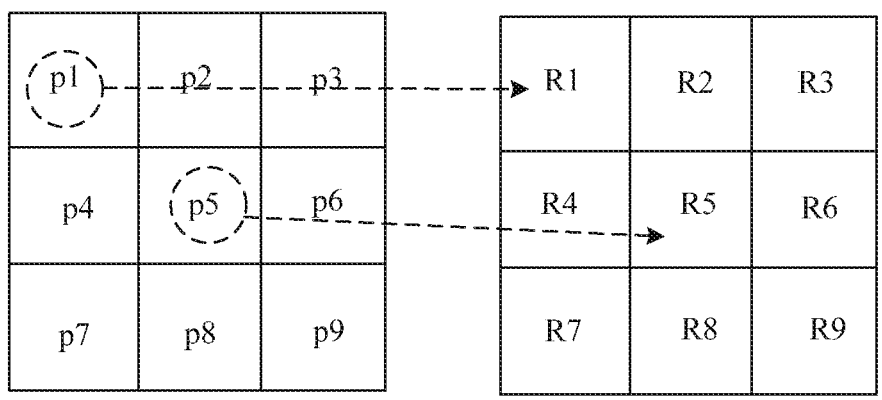
FIG. 6c is a schematic diagram showing a third correspondence between light rays transmitted through sub-pixels and the phase adjustment components according to an embodiment of the present disclosure.

In a case where the backlight 20 is a collimated backlight emitting light in a thickness direction of the display panel 10, as shown in FIGS. 6a and 6c, a light ray transmitted through a subdivided pixel having a light transmittance greater than zero travels towards a phase adjustment component located above or ahead the subdivided pixel. In this case, when determining a target subdivided pixel in each of the sub-pixels, the controller 40 determines the x-th subdivided pixel px as a target subdivided pixel if reverse extension lines of light rays exiting from a phase adjustment component Rx located above or ahead the subdivided pixel px, after light rays emitted from the subdivided pixel px pass through the phase adjustment component Rx, can converge at an image point, and the image point has a position corresponding to the target phase of the sub-pixel including the target subdivided pixel. Since a direction of a light ray depends on a phase of the light ray and an incident direction of the light ray is generally fixed, when determining a target subdivided pixel, a subdivided pixel may be determined as the target subdivided pixel according to the corresponding target phase and the phase adjustment amount of each of the phase adjustment components. The controller 40 may also determine two subdivided pixels in each of the sub-pixels as target subdivided pixels, and the determination method thereof is similar to that of determining one target subdivided pixel and will not be repeated herein.

Figure 6D:
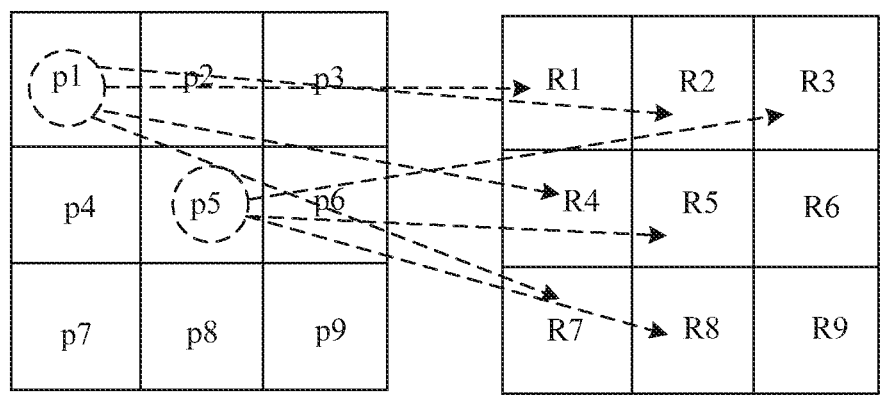
FIG. 6d is a schematic diagram showing a fourth correspondence between light rays transmitted through sub-pixels and the phase adjustment components according to an embodiment of the present disclosure.

In a case where the backlight 20 is a non-collimated backlight emitting light in various directions, the controller 40 is further configured to adjust directions of light rays transmitted through each of the subdivided pixels, so that the light rays transmitted through each of the subdivided pixels may travel towards different phase adjustment components. In this case, when determining a target subdivided pixel in each of the sub-pixels, the controller 40 determines the x-th subdivided pixel px as a target subdivided pixel if reverse extension lines of light rays exiting from the y-th phase adjustment component Ry, after light rays emitted from the subdivided pixel px pass through the phase adjustment component Ry, can converge at an image point, and the image point has a position corresponding to the target phase of the sub-pixel including the target subdivided pixel; and the controller 40 controls the light rays transmitted through the target subdivided pixel to travel towards the phase adjustment component Ry. Since directions of light rays depend on phases of the light rays, and the directions of light rays may be determined according to positional relationships between each of the subdivided pixels and corresponding phase adjustment components in a case where each of the subdivided pixels emits light towards the corresponding phase adjustment components, a target subdivided pixel may be determined according to the corresponding target phase, the phase adjustment amounts of corresponding phase adjustment components, and the positional relationship between the subdivided pixel and the phase adjustment components. The determination method to determine two subdivided pixels in each of the sub-pixels as target subdivided pixels is similar to that of determining one target subdivided pixel, and description thereof will be omitted herein. Compared with the collimated backlight, the non-collimated backlight enables light rays exiting from each of the subdivided pixels to irradiate onto different phase adjustment components, as shown in FIGS. 6b and 6d. Thus, the controller 40 may cause reverse extension lines of light rays exiting from the phase adjustment layer 30, after light rays emitted from each of the sub-pixels p pass through the phase adjustment layer 30, converge at a desired image point with more adjustment schemes. Thus, the control manner of the controller 40 is more flexible.

Optionally, an adjustment method for adjusting a direction of a light ray transmitted through each of the subdivided pixels may be various, and is not specifically limited herein. For example, the backlight 20 may include a plurality of light-emitting elements, and the plurality of light-emitting elements are in one-to-one correspondence with the plurality of subdivided pixels of the phase adjustment layer 30. Further, a light-emitting direction of each of the light-emitting elements is adjustable, and a direction of a light ray incident onto each of the subdivided pixels may be adjusted by adjusting the light-emitting direction of each of the light-emitting elements, thereby adjusting a direction of a light ray transmitted from each of the subdivided pixels.

As described above, the display panel 10 may include the array substrate 11 and the opposite substrate 12, and a color filter layer 13 may be provided on the opposite substrate 12. In the present disclosure, the phase adjustment layer 30 may be provided at a side of the opposite substrate 12 distal to the array substrate 11, or may be provided between the opposite substrate 12 and the array substrate 11. For example, the phase adjustment layer 30 is provided on the opposite substrate 12, and is located at the same side of the opposite substrate 12 as the color filter layer 13, so as to reduce a distance in the thickness direction between the phase adjustment layer 30 and the color filter layer 13 to the greatest extent, thereby reducing color cast. In other words, the phase adjustment layer 30 may be located between the opposite substrate 12 and the color filter layer 13.

As described above, each of the phase adjustment components may include a plurality of gratings. The gratings in a single phase adjustment component may have an identical period. The gratings of different phase adjustment components among the phase adjustment components corresponding to a single sub-pixel may have different periods. Thus, different phase adjustment components among the phase adjustment components corresponding to a single sub-pixel may have different phase adjustment amounts. Specifically, a quantity of the gratings of each of the phase adjustment components may be equal to or greater than 3. Optionally, each of the gratings may be a transmission grating such as a single-order grating, a multi-order grating, or the like. Each of the gratings may have a height ranging from 30 nm to 200 nm, and gratings having different periods may have different heights. Incident light rays will undergo diffraction after passing through the gratings of each of the phase adjustment components, and a diffraction angle $\theta$ of the m-th order diffracted wave of each of the gratings is determined by a period P of the grating, a wavelength $\lambda$ of the incident light rays, and an incident angle $\theta_0$ of the incident light rays, according to the following formula:

$$\sin\theta - \sin\theta_0 = m\lambda/P\ (m=0,\pm 1,\pm 2,\dots)$$

Since directions of light rays depend on the phases thereof, and the incident angle $\theta_0$ is known (i.e., the initial phase thereof is known) in a case where the backlight is a collimated backlight, a corresponding target subdivided pixel may be determined according to the period of a grating in each of the phase adjustment components once directions of light rays existing from each of the sub-pixels is determined (i.e., once a target phase thereof is determined). In a case where the backlight 20 is a non-collimated backlight from which a light ray is emitted in an adjustable direction, i.e., the incident angle $\theta_0$ is adjustable (or the initial phase thereof is adjustable), after a direction of a light ray existing from each of the sub-pixels is determined (i.e., after a corresponding target phase is determined), a corresponding target subdivided pixel and a direction of a light ray incident onto the target subdivided pixel may be determined according to the period P of a grating of each of the phase adjustment components.

Generally, the zero-th order diffraction and the first order diffraction of each of the gratings have larger intensities, and the remaining higher order diffractions have much weaker intensities than the zero-th and first order diffractions. The zero-th order diffracted wave travels along the incident light direction, and a diffraction direction of the first order diffracted wave may be controlled by the period of the grating. Thus, during the display of a hologram, a direction of a light ray (or, a phase of the light ray) is generally adjusted by using the first order diffracted wave (alternatively, the zero-th order diffracted wave may be employed in a case where a direction of an emergent light ray is very close to that of the incident light ray). In a case where an incident angle of a colored light ray is given and a difference between a phase of the colored light ray at a bar of the grating and a phase of the colored light ray at a gap of the grating is an odd multiple of half wavelength of the colored light ray, interference of light makes the zero-th order wave weakened and the first order wave enhanced. In a case where the difference in phase is an integer multiple of wavelength of the colored light ray, interference of light makes the zero-th order wave enhanced and the first order wave weakened. Thus, in a practical application, to eliminate or reduce the zero-th order diffracted wave of a colored light ray, a height of each of the gratings may be designed according to the wavelength of the colored light ray. Further, in a case where the gratings of each of the phase adjustment components are multi-order gratings, the greater quantity of steps of the gratings, the higher diffraction efficiency of the first order diffraction, and the higher the concentrated light energy. Thus, each of the phase adjustment components may include the multi-order gratings of 4 orders to 8 orders.

A planarization layer 15 may be provided between the gratings and the color filter layer 13, such that the color filter layer 13 may be provided on a planar surface. A refractive index of each of the gratings may be different from that of the planarization layer 15, and a difference between the refractive index of each of the gratings and the refractive index of the planarization layer 15 may be greater than 0.2, such that a light ray transmitted through the phase adjustment layer 30 has a phase which is changed significantly, and a direction of the light ray is changed accordingly. For example, each of the gratings may be made of a transparent resin.

Another embodiment of the present disclosure provides a holographic display method of the above-described holographic display device. The holographic display method may include, in a case where any stereoscopic image is to be displayed, steps of:

obtaining a target phase of a light ray to be transmitted through each of the plurality of sub-pixels of the display panel according to a position information of a to-be-displayed stereoscopic image, and obtaining a target intensity of the light ray to be transmitted through each of the plurality of sub-pixels according to image information of the to-be-displayed stereoscopic image;

determining a target subdivided pixel, which corresponds to the target phase, in each of the plurality of sub-pixels, and adjusting a light transmittance of the target subdivided pixel in each of the plurality of sub-pixels according to the target intensity of each of the plurality of sub-pixels; and controlling the backlight to provide reference light to the display panel, wherein, the light-wave information of the reference light may be the same as that of the reference light employed during the simulating process of a hologram recording, such that the light rays transmitted through each of the plurality of sub-pixels of the display panel have the corresponding target phases and target intensities. Thus, according to the reversibility of a light path, human eyes can see a stereoscopic image which is consistent with image information of an original object present at a position where the original object is located.

The configuration and imaging principle of the holographic display device have been described above, and will be omitted here. Since a light transmittance of each of the subdivided pixels of the display panel is adjustable, multiple different images may be displayed consecutively by using the above display method when holographic display is performed, thereby achieving dynamic stereoscopic display.

As described above, there may be one or two target subdivided pixels in each of sub-pixels, accordingly, the step of determining the target subdivided pixel, which corresponds to the target phase, in each of the plurality of sub-pixels may be performed in one of the following two manners. The first manner may include a step of: determining one subdivided pixel in each of the plurality of sub-pixels as the target subdivided pixel, wherein in a case where light rays emitted from the target subdivided pixel pass through one of the phase adjustment components corresponding to the sub-pixel including the target subdivided pixel, reverse extension lines of light rays exiting from the phase adjustment component converge at a position corresponding to the target phase of the sub-pixel. Alternatively, the second manner may include a step of: determining two subdivided pixels in each of the plurality of sub-pixels as the target subdivided pixels, wherein in a case where light rays emitted from the two target subdivided pixels pass through two of the phase adjustment components corresponding to the sub-pixel including the two target subdivided pixels, respectively, reverse extension lines of light rays exiting from the two phase adjustment components converge at a position corresponding to the target phase of the sub-pixel.

In an example, in a case where the backlight is a collimated backlight emitting light in a thickness direction of the display panel, the step of determining the target subdivided pixel, which corresponds to the target phase, in each of the plurality of sub-pixels may include steps of: determining a phase adjustment component which has a phase adjustment amount corresponding to the target phase as a target phase adjustment component, and determining a subdivided pixel which has a position corresponding to a position of the target phase adjustment component as the target subdivided pixel, so that in a case where light rays emitted from the target subdivided pixel pass through the phase adjustment component corresponding to the target subdivided pixel, reverse extension lines of light rays exiting from the phase adjustment component converge at a position corresponding to the target phase of the sub-pixel including the target subdivided pixel.

In another example, in a case where the backlight is configured to emit light towards different directions, the step of determining the target subdivided pixel, which corresponds to the target phase, in each of the plurality of sub-pixels may include steps of: adjusting directions of light rays transmitted through each of the subdivided pixels, and determining a subdivided pixel which emits light towards a phase adjustment component which has a phase adjustment amount corresponding to the target phase of the sub-pixel as the target subdivided pixel, so that in a case where light rays emitted from the target subdivided pixel pass through the phase adjustment component which has a phase adjustment amount corresponding to the target phase of the sub-pixel, reverse extension lines of light rays exiting from the phase adjustment component converge at a position corresponding to the target phase of the sub-pixel.

For example, in a case where the backlight is a collimated backlight, a quantity of target subdivided pixels in each of the sub-pixels may be one or two. In a case where the backlight is a non-collimated backlight, a quantity of target subdivided pixels in each of sub-pixels may also be one or two. In these cases, the determination method for determining a target subdivided pixel has been described above, and description thereof is omitted here.

The foregoing has described the holographic display device and the holographic display method according to the present disclosure. It can be seen that, since each of the plurality of sub-pixels may include the plurality of subdivided pixels each having an adjustable light transmittance, and the plurality of subdivided pixels of each of the plurality of sub-pixels respectively correspond to the plurality of phase adjustment components having mutually different phase adjustment amounts, a phase of a light ray exiting from each of the plurality of sub-pixels may be adjusted by adjusting position(s) of each of the plurality of sub-pixels (i.e., adjusting part of the subdivided pixels to transmit light and adjusting the remaining subdivided pixels not to transmit light), and an intensity of a light ray exiting from each of the plurality of sub-pixels may be adjusted by adjusting a light transmittance of each of the subdivided pixels. When a stereoscopic image is to be displayed, a target phase and a target intensity, which correspond to the stereoscopic image to be displayed, of each of the sub-pixels are obtained, and a phase and an intensity of a light ray exiting from each of the plurality of sub-pixels are adjusted to be the corresponding target phase and the corresponding target intensity, respectively. Thus, human eyes can see a reproduced image which has the same position, color, and brightness as the original object. When different stereoscopic images are to be displayed, a light transmittance of each of the subdivided pixels may be adjusted according to the target phases and the target intensities corresponding to the different stereoscopic images to be displayed.

In this way, different stereoscopic images are reproduced in a time unit, thereby achieving dynamic holographic display.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A holographic display device, comprising:
   a display panel, comprising a plurality of sub-pixels, wherein each of the plurality of sub-pixels comprises a plurality of subdivided pixels, and each of the plurality of subdivided pixels has an adjustable light transmittance;
   a backlight, provided at a light incident side of the display panel, and configured to provide reference light to the display panel;
   a phase adjustment layer, comprising a plurality of phase adjustment components which are transparent, wherein positions of the plurality of phase adjustment components are in one-to-one correspondence with positions of the plurality of subdivided pixels, each of the plurality of phase adjustment components is configured to adjust a phase of a light ray transmitted through the phase adjustment component, and the phase adjustment components corresponding to a single sub-pixel have phase adjustment amounts different from each other; and a controller, configured to obtain a target phase of a light ray to be transmitted through each of the plurality of sub-pixels of the display panel according to a position information of a to-be-displayed stereoscopic image and determine a target subdivided pixel, which corresponds to the target phase, in each of the plurality of sub-pixels, and the controller being further configured to obtain a target intensity of the light ray to be transmitted through each of the plurality of sub-pixels according to image information of the to-be-displayed stereoscopic image, and adjust a light transmittance of the target subdivided pixel in each of the plurality of sub-pixels according to the target intensity.

2. The holographic display device according to claim 1, wherein each of the plurality of sub-pixels comprises one target subdivided pixel in a case where one stereoscopic image is to be displayed; and the plurality of phase adjustment components have a configuration such that, in a case where light rays emitted from the target subdivided pixel pass through one of the phase adjustment components corresponding to the sub-pixel comprising the target subdivided pixel, reverse extension lines of light rays exiting from the one phase adjustment component converge at a position corresponding to the target phase of the sub-pixel.

3. The holographic display device according to claim 1, wherein each of the plurality of sub-pixels comprises two target subdivided pixels in a case where one stereoscopic image is to be displayed; and the plurality of phase adjustment components have a configuration such that, in a case where light rays emitted from the two target subdivided pixels pass through two of the phase adjustment components corresponding to the sub-pixel comprising the two target subdivided pixels, respectively, reverse extension lines of light rays exiting from the two phase adjustment components converge at a position corresponding to the target phase of the sub-pixel.

4. The holographic display device according to claim 1, wherein the backlight is a collimated backlight emitting light in a thickness direction of the display panel.

5. The holographic display device according to claim 1, wherein the backlight is configured to emit light towards different directions, and the controller is further configured to adjust directions of light rays transmitted through each of the subdivided pixels.

6. The holographic display device according to claim 1, wherein the display panel comprises an array substrate and an opposite substrate which are assembled to form a cell, a color filter layer is provided at a side of the opposite substrate proximal to the array substrate, the color filter layer comprises a plurality of color resist blocks, and the plurality of color resist blocks are in one-to-one correspondence with the plurality of sub-pixels; and the phase adjustment layer is provided on the opposite substrate at the side where the color filter layer is located.

7. The holographic display device according to claim 6, wherein the phase adjustment layer is located between the opposite substrate and the color filter layer.

8. The holographic display device according to claim 1, wherein each of the phase adjustment components comprises a plurality of gratings, the gratings in a single phase adjustment component have a same period, and the gratings in different phase adjustment components among the phase adjustment components corresponding to a single sub-pixel have different periods.

9. The holographic display device according to claim 8, wherein a planarization layer is provided between the plurality of gratings and the color filter layer, and a refractive index of each of the plurality of gratings is different from that of the planarization layer.

10. The holographic display device according to claim 9, wherein each of the plurality of gratings is made of a transparent resin.

11. A holographic display method of a holographic display device, wherein the holographic display device is the holographic display device according to claim 1, and the holographic display method comprises, in a case where any one stereoscopic image is to be displayed, steps of:

obtaining by the controller a target phase of a light ray to be transmitted through each of the plurality of sub-pixels of the display panel according to a position information of a to-be-displayed stereoscopic image, and obtaining by the controller a target intensity of the light ray to be transmitted through each of the plurality of sub-pixels according to image information of the to-be-displayed stereoscopic image;

determining by the controller a target subdivided pixel, which corresponds to the target phase, in each of the plurality of sub-pixels, and adjusting by the controller a light transmittance of the target subdivided pixel in each of the plurality of sub-pixels according to the target intensity of each of the plurality of sub-pixels; and controlling by the controller the backlight to provide reference light to the display panel.

12. The holographic display method according to claim 11, wherein the step of determining by the controller the target subdivided pixel, which corresponds to the target phase, in each of the plurality of sub-pixels comprises a step of:

determining one subdivided pixel in each of the plurality of sub-pixels as the target subdivided pixel, wherein in a case where light rays emitted from the target subdivided pixel pass through one of the phase adjustment components corresponding to the sub-pixel comprising the target subdivided pixel, reverse extension lines of light rays exiting from the one phase adjustment component converge at a position corresponding to the target phase of the sub-pixel.

13. The holographic display method according to claim 11, wherein the step of determining by the controller the target subdivided pixel, which corresponds to the target phase, in each of the plurality of sub-pixels comprises a step of:

determining two subdivided pixels in each of the plurality of sub-pixels as the target subdivided pixels, wherein in a case where light rays emitted from the two target subdivided pixels pass through two of the phase adjustment components corresponding to the sub-pixel comprising the two target subdivided pixels, respectively, reverse extension lines of light rays exiting from the two phase adjustment components converge at a position corresponding to the target phase of the sub-pixel.

14. The holographic display method according to claim 11, wherein in a case where the backlight is a collimated backlight emitting light in a thickness direction of the display panel, the step of determining by the controller the target subdivided pixel, which corresponds to the target phase, in each of the plurality of sub-pixels comprises steps of:

determining a phase adjustment component which has a phase adjustment amount corresponding to the target phase as a target phase adjustment component, and determining a subdivided pixel which has a position corresponding to a position of the target phase adjustment component as the target subdivided pixel, so that in a case where light rays emitted from the target subdivided pixel pass through the phase adjustment component corresponding to the target subdivided pixel, reverse extension lines of light rays exiting from the phase adjustment component converge at a position corresponding to the target phase of the sub-pixel comprising the target subdivided pixel.

15. The holographic display method according to claim 11, wherein, in a case where the backlight is configured to emit light towards different directions, the step of determining by the controller the target subdivided pixel, which corresponds to the target phase, in each of the plurality of sub-pixels comprises steps of:

adjusting directions of light rays transmitted through each of the subdivided pixels, and determining a subdivided pixel which emits light towards a phase adjustment component which has a phase adjustment amount corresponding to the target phase of the sub-pixel as the target subdivided pixel, so that in a case where light rays emitted from the target subdivided pixel pass through the phase adjustment component which has a phase adjustment amount corresponding to the target phase of the sub-pixel, reverse extension lines of light rays exiting from the phase adjustment component converge at a position corresponding to the target phase of the sub-pixel.

16. The holographic display device according to claim 2, wherein the backlight is configured to emit light towards different directions, and the controller is further configured to adjust directions of light rays transmitted through each of the subdivided pixels.

17. The holographic display device according to claim 3, wherein the backlight is configured to emit light towards different directions, and the controller is further configured to adjust directions of light rays transmitted through each of the subdivided pixels.

18. The holographic display device according to claim 2, wherein each of the phase adjustment components comprises a plurality of gratings, the gratings in a single phase adjustment component have a same period, and the gratings in different phase adjustment components among the phase adjustment components corresponding to a single sub-pixel have different periods.

19. The holographic display device according to claim 3, wherein each of the phase adjustment components comprises a plurality of gratings, the gratings in a single phase adjustment component have a same period, and the gratings in different phase adjustment components among the phase adjustment components corresponding to a single sub-pixel have different periods.

* * * * *